(12) United States Patent
Berry

(10) Patent No.: US 10,975,777 B2
(45) Date of Patent: Apr. 13, 2021

(54) FUEL METERING UNIT

(71) Applicant: Hamilton Sundstrand Corporation, Charlotte, NC (US)

(72) Inventor: Erin E. Berry, Roscoe, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 122 days.

(21) Appl. No.: 16/148,477

(22) Filed: Oct. 1, 2018

(65) Prior Publication Data
US 2020/0102893 A1 Apr. 2, 2020

(51) Int. Cl.
*F02C 9/26* (2006.01)
*F02C 7/232* (2006.01)

(52) U.S. Cl.
CPC .............. *F02C 9/263* (2013.01); *F02C 7/232* (2013.01); *F05D 2220/32* (2013.01)

(58) Field of Classification Search
CPC ................................. F02C 7/232; F02C 9/263
USPC ......................................................... 137/554
See application file for complete search history.

(56) References Cited

U.S. PATENT DOCUMENTS

| | | | | | |
|---|---|---|---|---|---|
| 2,836,198 | A | * | 5/1958 | McNeill | F16K 39/04 137/625.39 |
| 3,035,610 | A | * | 5/1962 | Prunty | F15B 13/04 137/596.13 |
| 3,115,750 | A | * | 12/1963 | Cowles | F02C 9/28 60/791 |
| 3,747,642 | A | * | 7/1973 | Tolbert, Jr. | F16K 11/0708 137/625.69 |
| 3,881,512 | A | * | 5/1975 | Wilke | F15B 11/16 137/596.13 |
| 4,494,507 | A | | 1/1985 | Yasuhara | |
| 5,689,071 | A | * | 11/1997 | Ruffner | G01F 1/115 73/861.84 |
| 6,135,135 | A | * | 10/2000 | Futa, Jr. | F02C 7/232 137/115.03 |
| 6,651,442 | B2 | | 11/2003 | Davies et al. | |
| 6,751,942 | B2 | | 6/2004 | Mahoney et al. | |
| 7,028,561 | B2 | * | 4/2006 | Robertson | F16K 37/0041 73/861.79 |
| 8,991,186 | B2 | | 3/2015 | Bickley et al. | |
| 9,032,786 | B2 | | 5/2015 | Masse et al. | |
| 9,193,046 | B2 | | 11/2015 | Landrum | |
| 9,217,372 | B2 | | 12/2015 | Paradise | |
| 9,303,784 | B2 | | 4/2016 | Ballard et al. | |
| 9,983,096 | B2 | | 5/2018 | Martucci et al. | |
| 2001/0052338 | A1 | | 12/2001 | Yates | |
| 2004/0221896 | A1 | | 11/2004 | Ballenger et al. | |

(Continued)

OTHER PUBLICATIONS

European Search Report for Application No. 19200555.1, dated Jul. 14, 2020, 8 pages.

*Primary Examiner* — Angelisa L. Hicks
(74) *Attorney, Agent, or Firm* — Cantor Colburn LLP

(57) ABSTRACT

A fuel metering unit includes a metering valve and a sensor. The metering valve includes a valve body movably disposed within a valve housing. The valve body defines a first bore that extends from a first valve body end towards a second valve body end along a first axis and a first window that extends through the valve body along a second axis. The sensor extends at least partially through the valve housing and faces towards the first window. The sensor being arranged to provide a signal indicative of a position of the first window relative to the sensor.

14 Claims, 8 Drawing Sheets

(56) References Cited

U.S. PATENT DOCUMENTS

| | | | |
|---|---|---|---|
| 2006/0174948 A1* | 8/2006 | Caruso | F16K 11/07 |
| | | | 137/554 |
| 2014/0069102 A1* | 3/2014 | Satienpoch | F02C 7/232 |
| | | | 60/734 |
| 2016/0195081 A1 | 7/2016 | Stobbe | |
| 2017/0227424 A1* | 8/2017 | Martucci | F02C 9/263 |

* cited by examiner

FUEL METERING UNIT

BACKGROUND

Gas turbine engine fuel control systems may incorporate fuel metering units that regulate the supply of fuel to the gas turbine engine. The performance of the fuel metering unit is affected by the performance of the fuel pump. Traditionally, the fuel pump performance is not directly measured, making an assessment of the remaining life of the fuel metering unit or the fuel pump difficult.

BRIEF DESCRIPTION

Disclosed is a fuel metering unit that includes a metering valve and a sensor. The metering valve includes a valve body movably disposed within a valve housing. The valve body defines a first bore that extends from a first valve body end towards a second valve body end along a first axis and a first window that extends through the valve body along a second axis. The sensor extends at least partially through the valve housing and faces towards the first window. The sensor being arranged to provide a signal indicative of a position of the first window relative to the sensor.

Also disclosed is a metering valve for a fuel metering unit. The metering valve includes a valve housing and a valve body. The valve housing defines a housing bore that extends from a first valve housing end towards a second valve housing end along a first axis. The valve body is disposed within the housing bore. The valve body has an outer surface that extends between a first valve body end and a second valve body end along the first axis. The valve body defines a first recessed region that radially extends from the outer surface towards the first axis.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
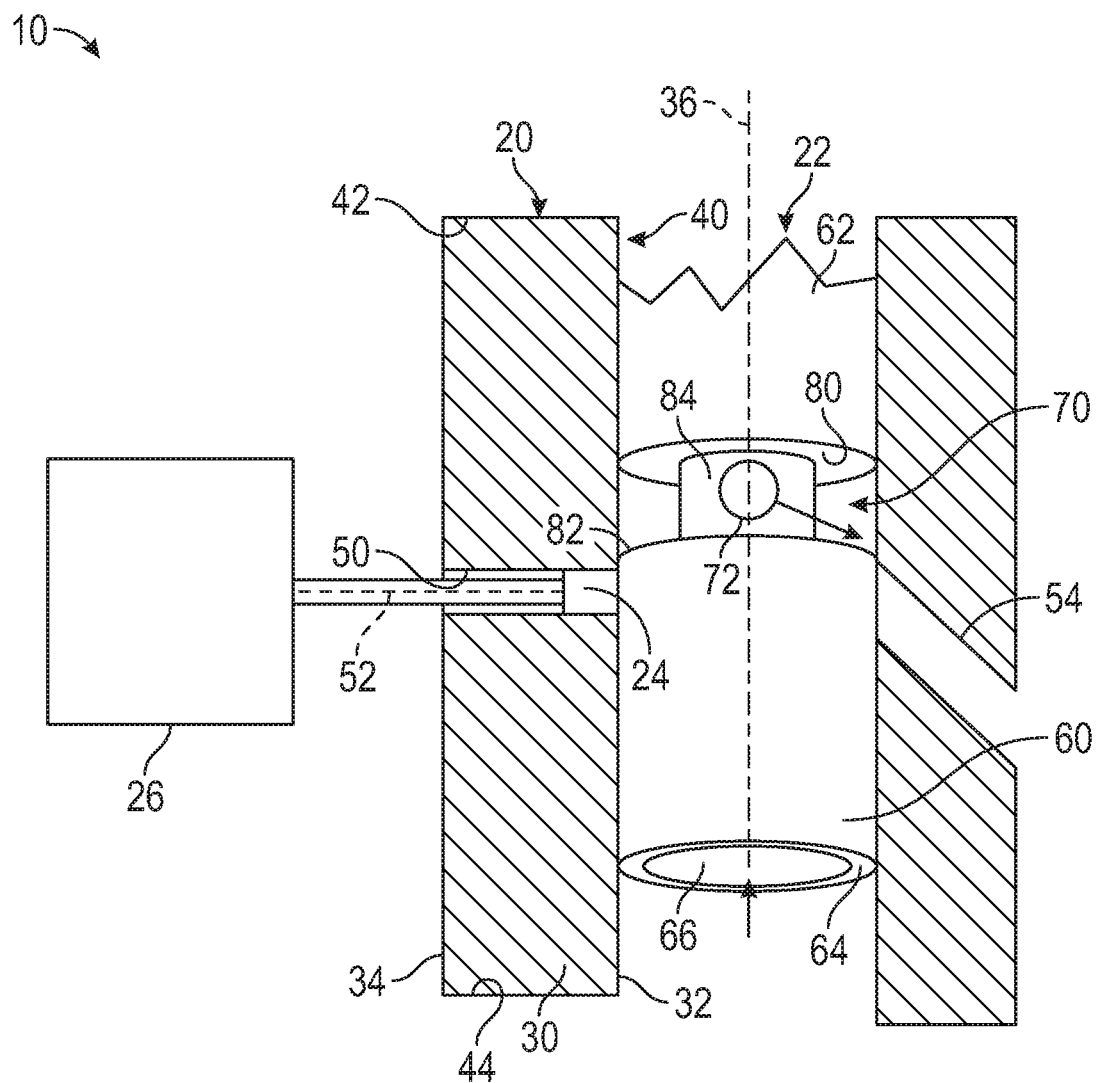
FIGS. 1A-1C are views of a first embodiment of a valve body of a fuel metering unit in various axial positions indicative of a fuel level.

A detailed description of one or more embodiments of the disclosed apparatus and method are presented herein by way of exemplification and not limitation with reference to the Figures.

A fuel control system for a gas turbine engine may include a fuel metering unit that is arranged to regulate fuel flow from a fuel pump to the gas turbine engine. Referring to the Figures, the fuel metering unit may include a metering valve 10 having a valve housing 20, a valve body 22 movably disposed within the valve housing 20, a sensor 24 that is arranged to determine a position of the valve body 22, and a controller 26.

The valve housing 20 includes a housing wall 30 having an inner wall surface 32 and an outer wall surface 34 each disposed about a first axis 36. The inner wall surface 32 defines a housing bore 40 that axially extends from a first valve housing end 42 towards a second valve housing end 44 along the first axis 36.

The housing wall 30 defines a sensor bore or sensor opening 50 that extends along a second axis 52 that is disposed generally transverse to the first axis 36. The sensor bore or the sensor opening 50 extends from the outer wall surface 34 to the inner wall surface 32. The housing wall 30 further defines a bypass port 54 that is spaced apart from the sensor opening 50. The bypass port 54 extends from the inner wall surface 32 to the outer wall surface 34. The bypass port 54 extends along an axis that is disposed in a non-parallel and non-perpendicular relationship with respect to the first axis 36 and/or the second axis 52.

The valve body 22 is arranged to move within the housing bore 40 of the valve housing 20 responsive to changes in fuel flow rate through the metering valve 10 based on a fuel level or the performance of the fuel pump operatively connected to the metering valve 10. The valve body 22 is movable along the first axis 36 to selectively facilitate fuel flow through the bypass port 54 based on the amount of fuel flow provided through the metering valve 10 from the fuel pump.

The valve body 22 includes an outer surface 60 that extends between a first valve body end 62 and a second valve body end 64 along the first axis 36. The valve body 22 defines a first bore 66 that extends from the first valve body end 62 towards the second valve body end 64 along the first axis 36. The first bore 66 is arranged to receive a fuel flow from the fuel pump.

Figure 1B:
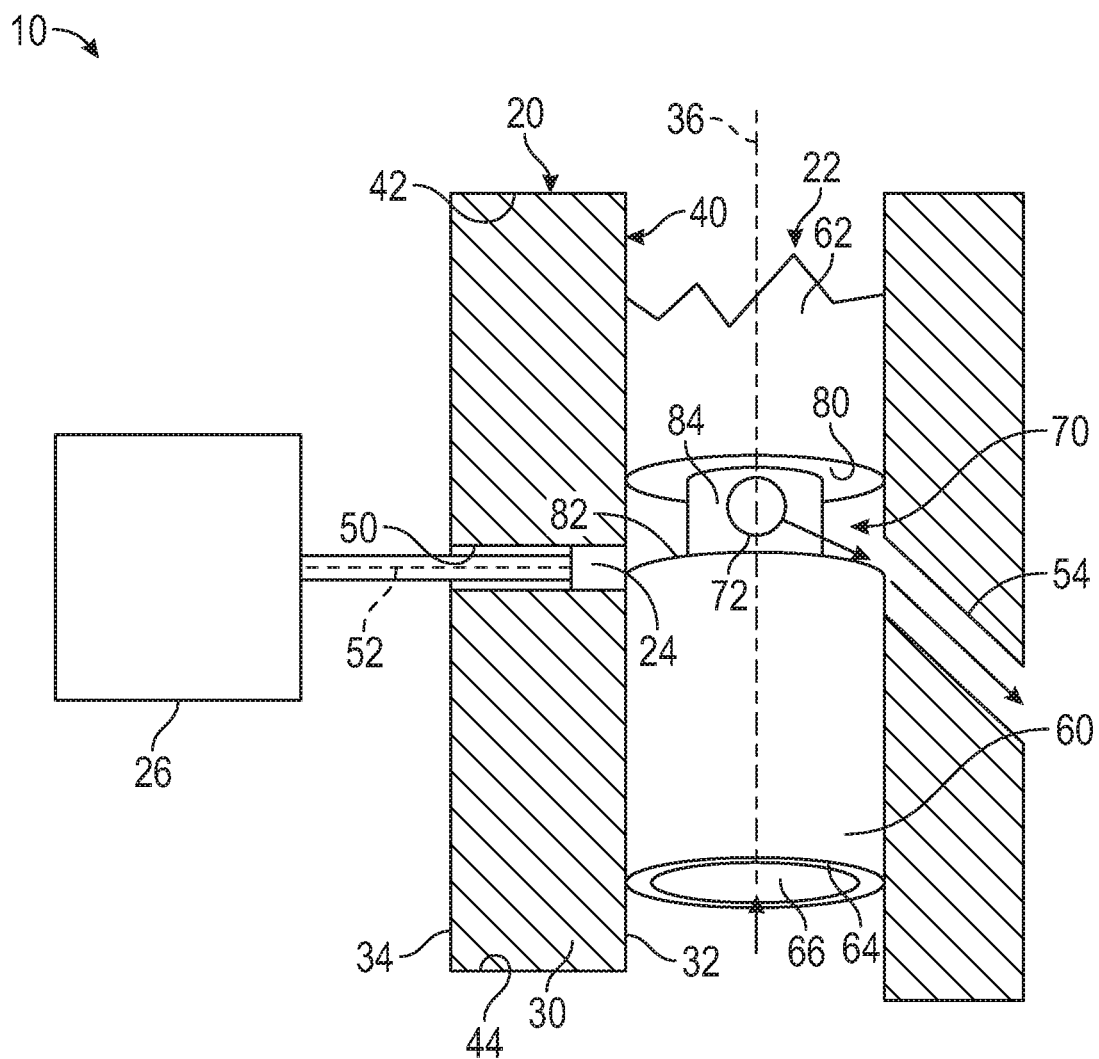
Figure 1C:
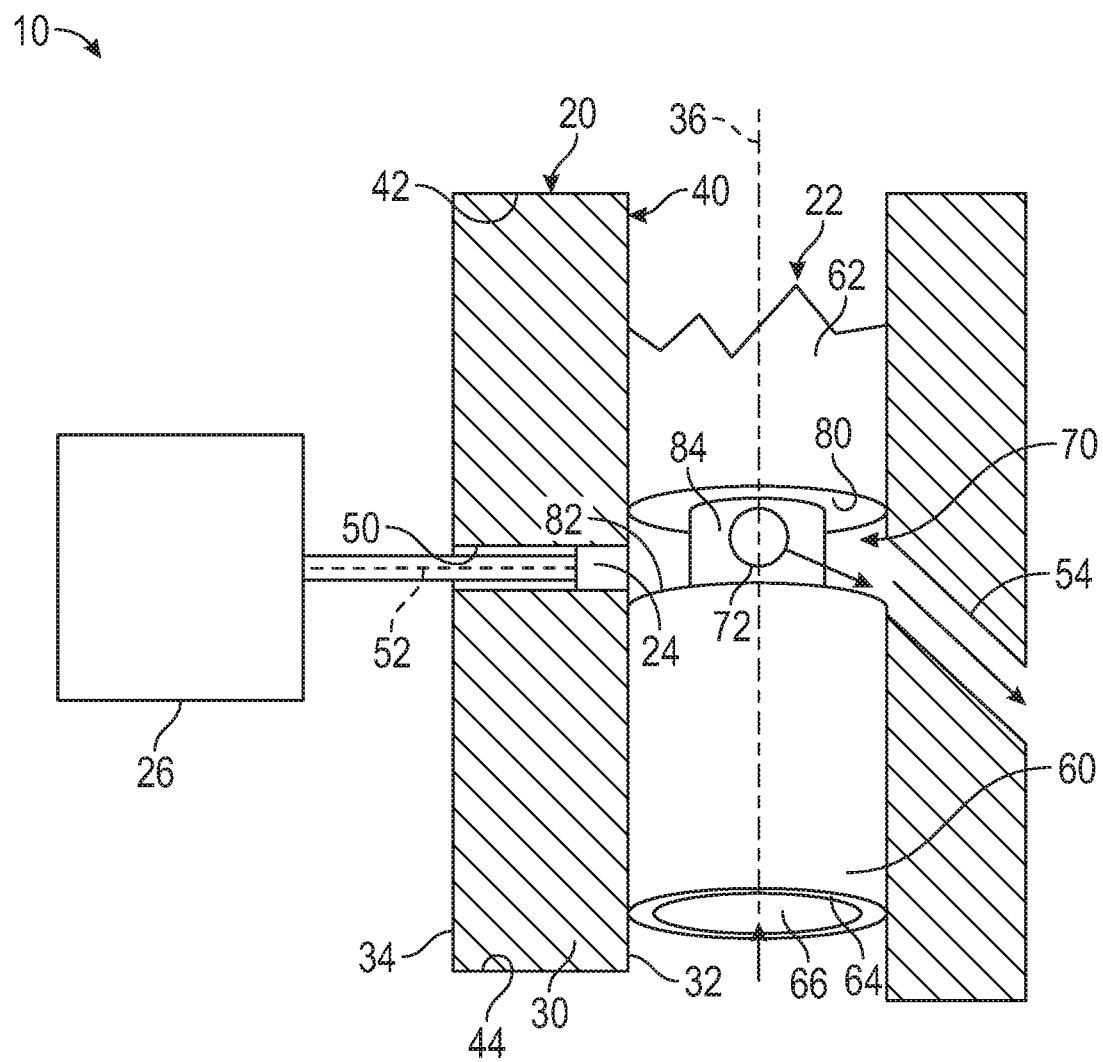

Referring to FIGS. 1A-1C, the valve body 22 defines a first recessed region 70 and a first window 72 that is defined within the first recessed region 70. The first recessed region 70 radially extends inward (relative to the first axis 36) from the outer surface 60 of the valve body 22 towards the first bore 66 and/or the first axis 36. The first recessed region 70 includes a first face 80, a second face 82 that is spaced apart from the first face 80, and a first monitoring surface 84 that extends between the first face 80 and the second face 82. The first face 80 and the second face 82 may be disposed generally parallel to each other or may be disposed in a non-parallel, non-perpendicular relationship with respect to each other and the first monitoring surface 84. The first monitoring surface 84 is disposed generally parallel to the first axis 36.

A first radial distance, d1, is defined between the first monitoring surface 84 and the outer surface 60 of the valve body 22. The first radial distance corresponds to a depth of the first recessed region 70.

The first window 72 is defined by or extends through the first monitoring surface 84. The first window 72 extends along the second axis 52 through the valve body 22. The first window 72 is fluidly connected to the first bore 66. A fuel flow from the fuel pump may enter the first bore 66 and flow through the valve body 22 and a portion of the fuel flow may be bypassed such that the fuel flows through the first window 72 and out of the bypass port 54 based on a position of the valve body 22 relative to the bypass port 54.

The first window 72 is selectively fluidly connected to the bypass port 54 based on the position of the first window 72 relative to the bypass port 54. The valve body 22 may be in a first position that corresponds to a no fuel or low fuel condition in which fuel bypass flow from the first window 72 to the bypass port 54 is inhibited, as shown in FIG. 1A. While the valve body 22 is in the first position, the first window 72 is not in fluid communication with the bypass port 54 because the outer surface 60 of the valve body 22 blocks the bypass port 54. The valve body 22 may be in a second position that corresponds to a medium fuel or non-maximum, non-minimum fuel condition facilitating a partial fuel bypass flow from the first window 72 to the bypass port 54, as shown in FIG. 1B. While the valve body 22 is in the second position, the first window 72 is in partial fluid communication with the bypass port 54 because the outer surface 60 of the valve body 22 only partially blocks the bypass port 54. The valve body 22 may be in a third position that corresponds to a maximum fuel condition facilitating a fuel bypass flow from the first window 72 to the bypass port 54, as shown in FIG. 1C. While the valve body 22 is in the third position, the first window 72 is in fluid communication with bypass port 54 and the outer surface 60 of the valve body 22 is spaced apart from the bypass port 54.

Figure 2A:
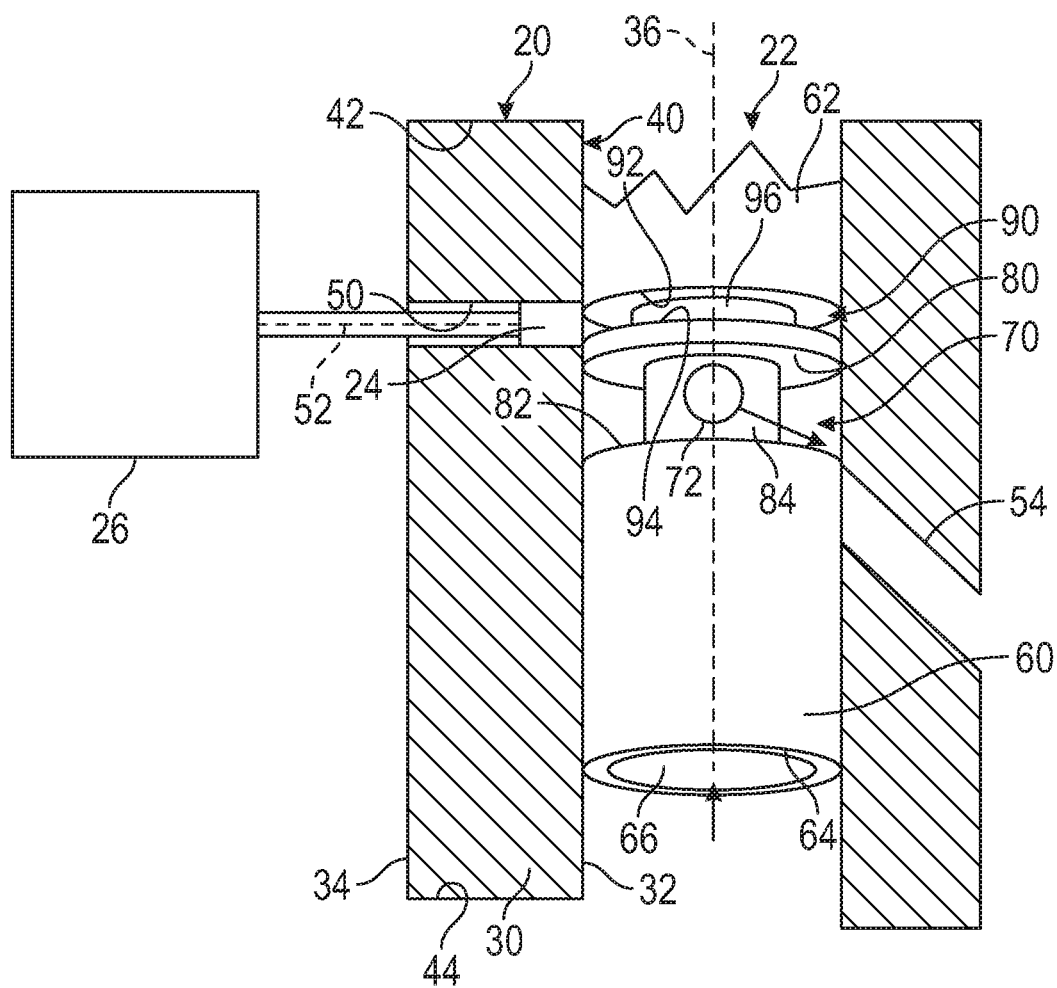
FIGS. 2A and 2B are views of a second embodiment of a valve body of a fuel metering unit in various axial positions indicative of a fuel level.
Figure 2B:
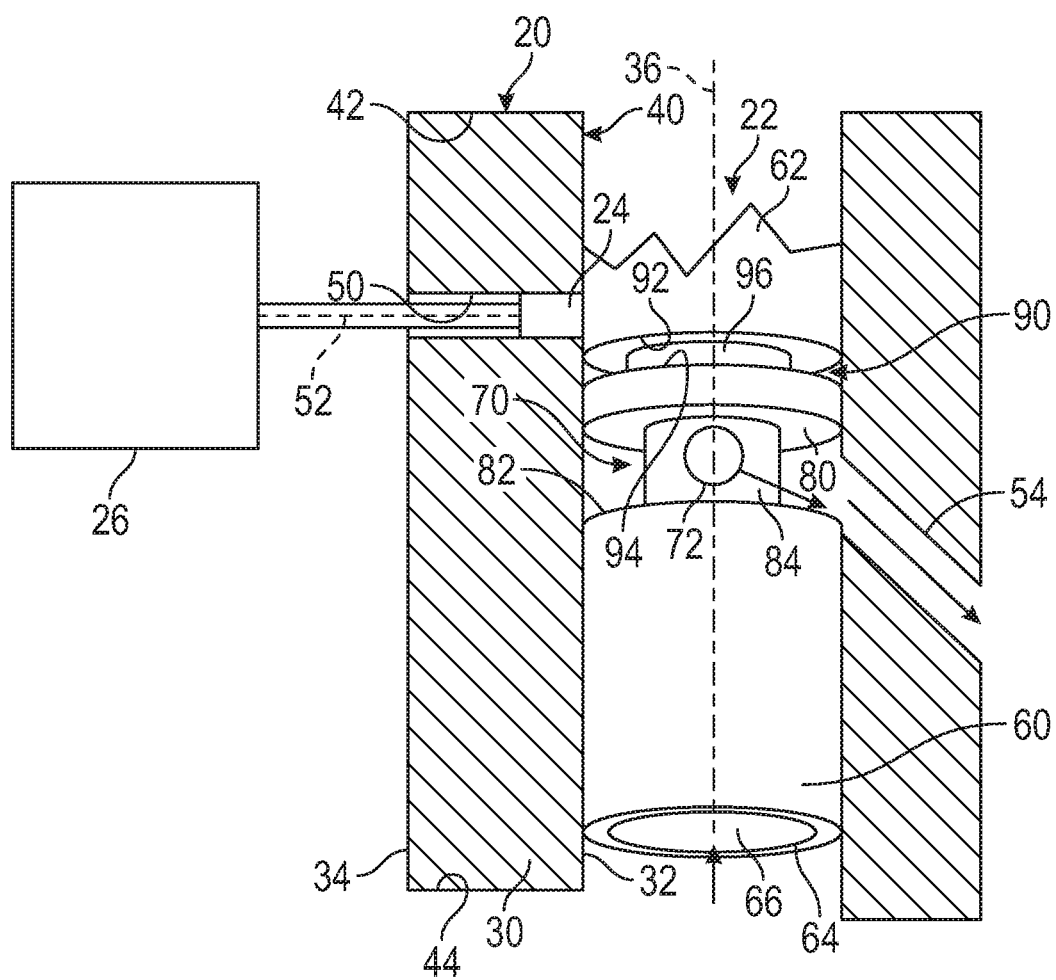

Referring to FIGS. 2A-2B, the valve body 22 defines the first recessed region 70 and a second recessed region 90. The second recessed region 90 is axially spaced apart from the first recessed region 70 relative to the first axis 36. The second recessed region 90 radially extends inward from the outer surface 60 towards the first axis 36 and/or the first bore 66.

The second recessed region 90 includes a third face 92, a fourth face 94 that is spaced apart from the third face 92, and a second monitoring surface 96 that extends between the third face 92 and the fourth face 94. The third face 92 and the fourth face 94 may be disposed generally parallel to each other or may be disposed in a non-parallel, non-perpendicular relationship with respect to each other and the second monitoring surface 96. The second monitoring surface 96 is disposed generally parallel to the first axis 36 and the first monitoring surface 84.

The first window 72 may be defined by or extends through at least one of the first monitoring surface 84 and/or the second monitoring surface 96.

A second radial distance, d2, is defined between the second monitoring surface 96 and the outer surface 60 of the valve body 22. The second radial distance corresponds to a depth of the second recessed region 90. The first radial distance is greater than the second radial distance.

The valve body 22 may be in a first position that corresponds to a no fuel or low fuel condition in which fuel bypass flow from the first window 72 to the bypass port 54 is inhibited, as shown in FIG. 2A. While the valve body 22 is in the first position, the second monitoring surface 96 is at least partially aligned with the sensor opening 50 and the first window 72 is not in fluid communication with the bypass port 54 because the outer surface 60 of the valve body 22 blocks the bypass port 54. The valve body 22 may be in a second position that corresponds to a maximum fuel condition facilitating a fuel bypass flow from the first window 72 to the bypass port 54, as shown in FIG. 2B. While the valve body 22 is in the second position, the second monitoring surface 96 is not aligned with the sensor opening 50 and the first window 72 is in fluid communication with the bypass port 54.

Figure 3A:
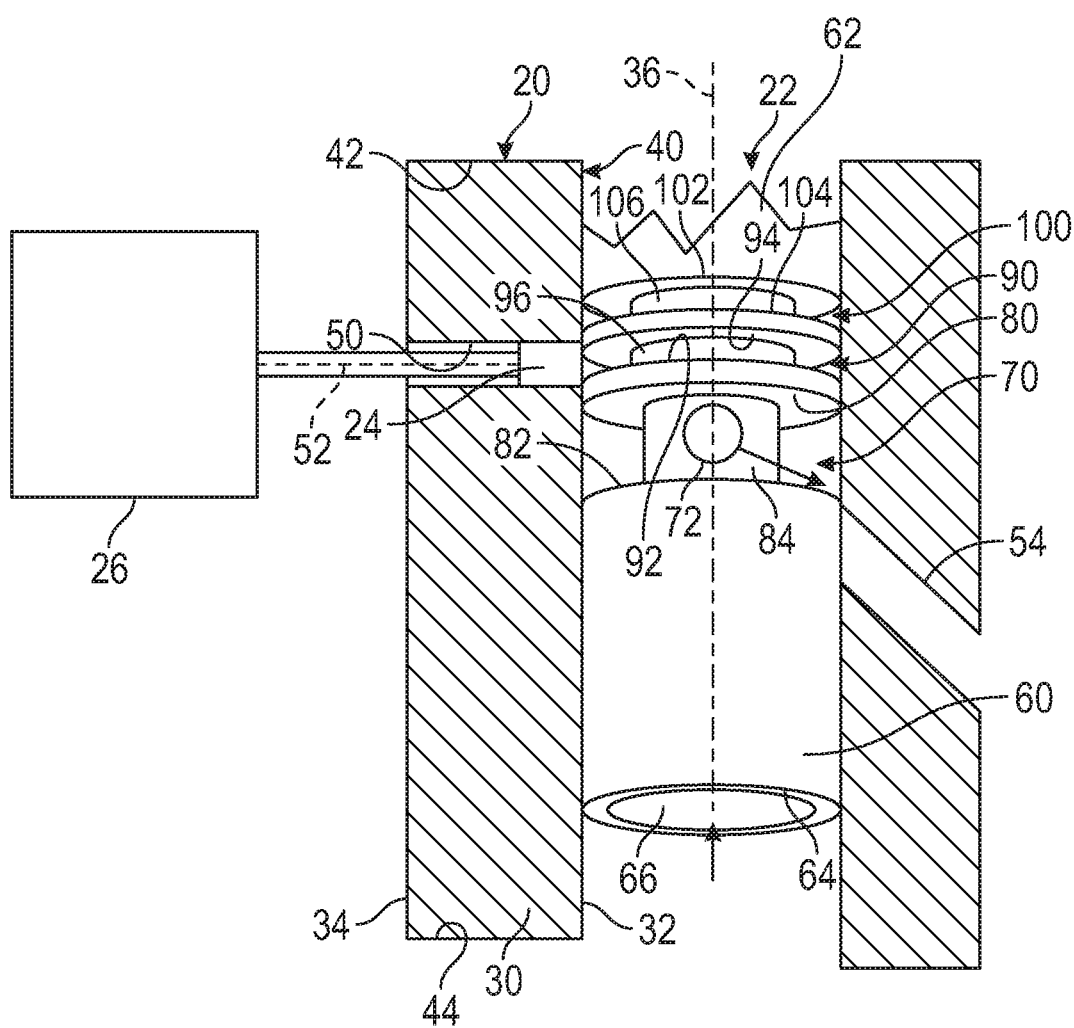
FIGS. 3A-3C are views of a third embodiment of a valve body of a fuel metering unit in various axial positions indicative of a fuel level.
Figure 3B:
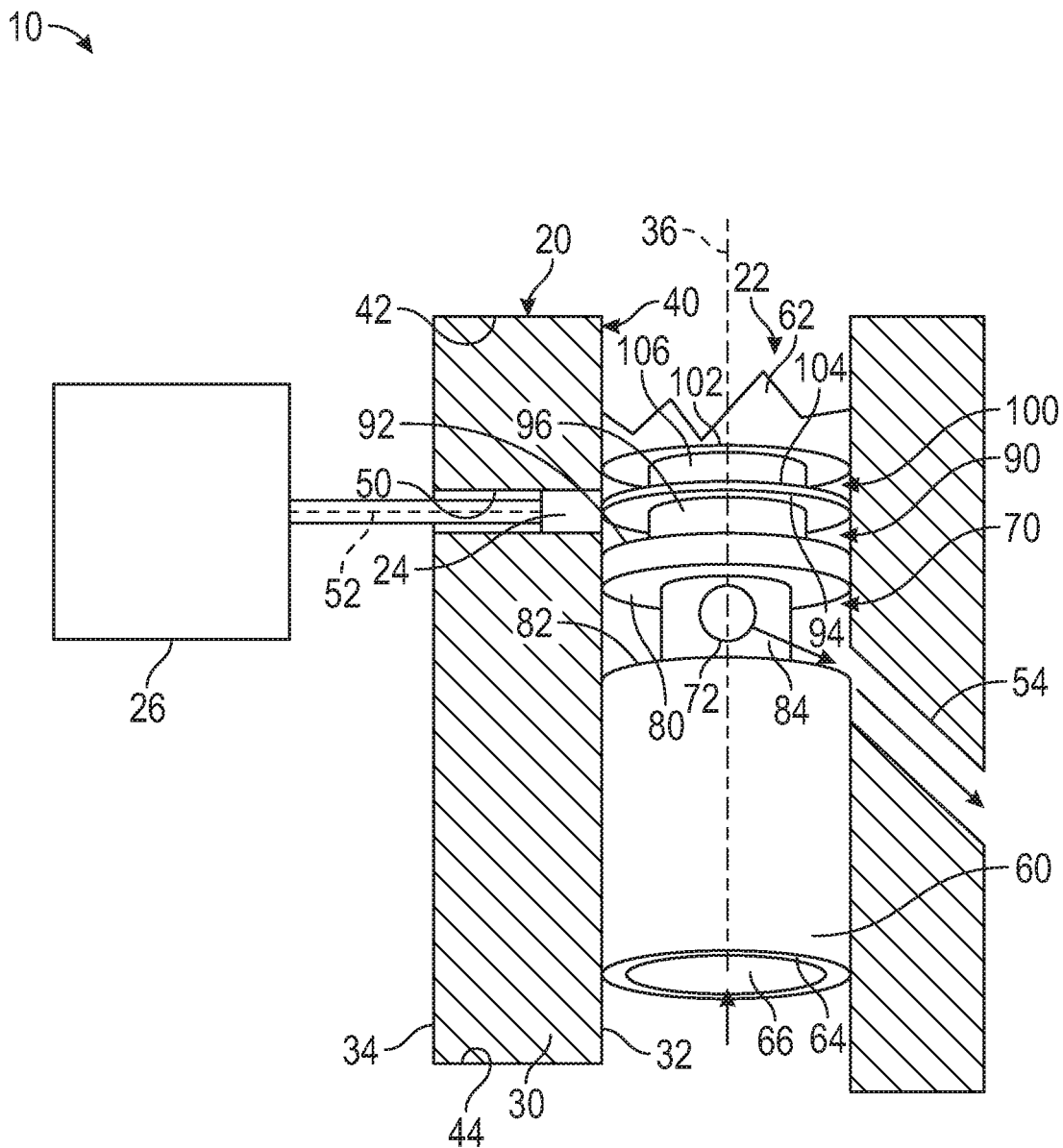
Figure 3C:
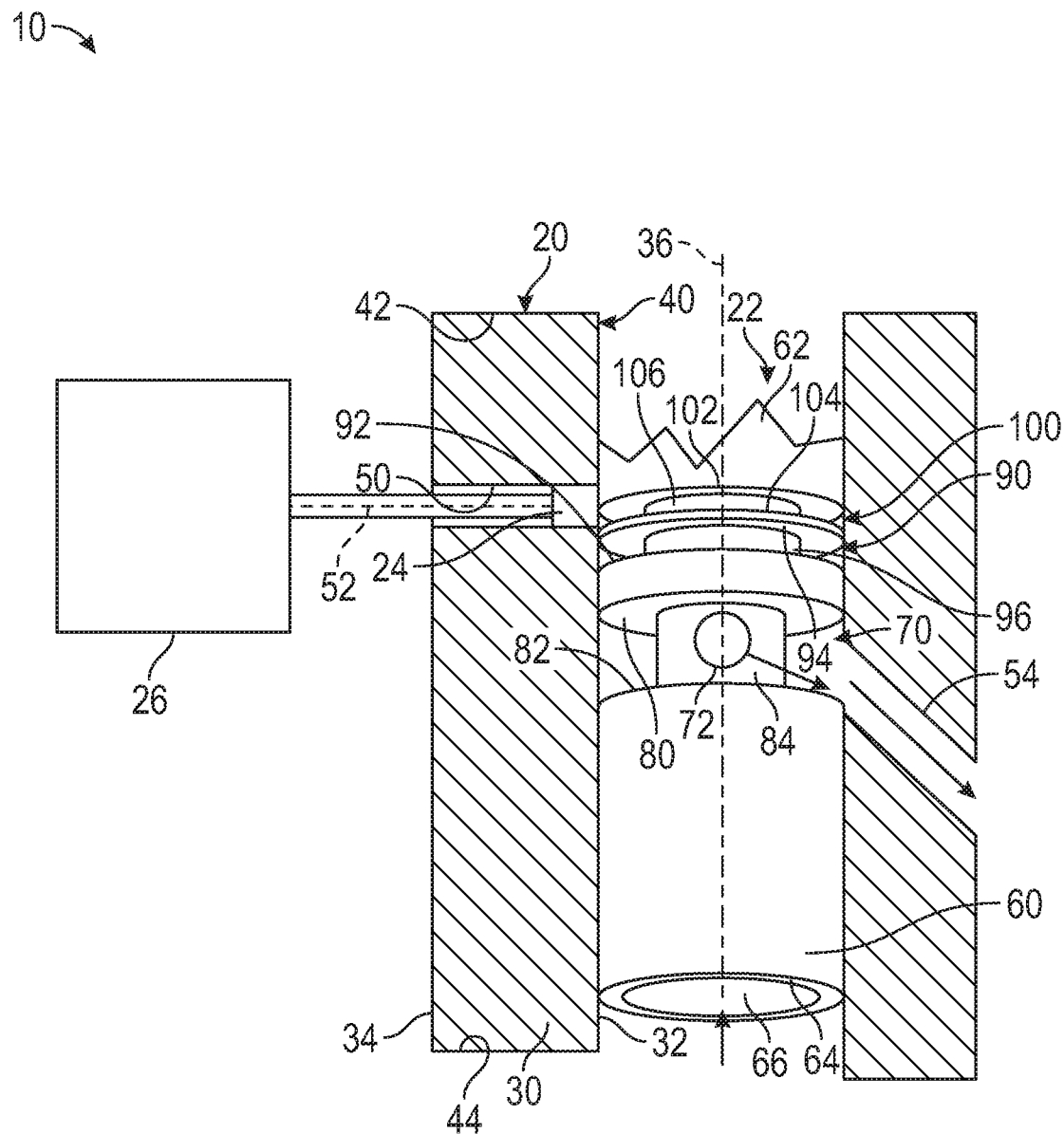

Referring to FIGS. 3A-3C, the valve body 22 defines the first recessed region 70, the second recessed region 90, and a third recessed region 100. The third recessed region 100 is axially spaced apart from the first recessed region 70 and the second recessed region 90 relative to the first axis 36. The third recessed region 100 radially extends from the outer surface 60 towards the first axis 36 and/or the first bore 66.

The third recessed region 100 includes a fifth face 102, a sixth face 104 that is spaced apart from the fifth face 102, and a third monitoring surface 106 that extends between the fifth face 102 and the sixth face 104. The fifth face 102 and the sixth face 104 may be disposed generally parallel to each other or may be disposed in a non-parallel, non-perpendicular relationship with respect to each other and the third monitoring surface 106. The third monitoring surface 106 is disposed generally parallel to the first axis 36, the first monitoring surface 84, and the second monitoring surface 96.

The first window 72 may be defined by or extend through at least one of the first monitoring surface 84, the second monitoring surface 96, and/or the third monitoring surface 106.

A third radial distance, d3, is defined between the third monitoring surface 106 and the outer surface 60 of the valve body 22. The third radial distance corresponds to a depth of the third recessed region 100. The first radial distance is greater than the second radial distance and the third radial distance. In at least one embodiment, the second radial distance is greater than the third radial distance.

The valve body 22 may be in a first position that corresponds to a no fuel or low fuel condition in which fuel bypass flow from the first window 72 to the bypass port 54 is inhibited, as shown in FIG. 3A. While the valve body 22 is in the first position, the first window 72 is not in fluid communication with the bypass port 54 because the outer surface 60 of the valve body 22 blocks the bypass port 54. The valve body 22 may be in a second position that corresponds to a medium fuel or non-maximum, non-minimum fuel condition facilitating a partial fuel bypass flow from the first window 72 to the bypass port 54, as shown in FIG. 3B. While the valve body 22 is in the second position, the sensor opening 50 is generally aligned with the second monitoring surface 96 and the first window 72 is in partial fluid communication with the bypass port 54 because the outer surface 60 of the valve body 22 only partially blocks the bypass port 54. The valve body 22 may be in a third position that corresponds to a maximum fuel condition facilitating a fuel bypass flow from the first window 72 to the bypass port 54, as shown in FIG. 3C. While the valve body 22 is in the third position, the sensor opening 50 is generally aligned with the third monitoring surface 106 and the first window 72 is in fluid communication with bypass port 54 and the outer surface 60 of the valve body 22 is spaced apart from the bypass port 54.

Referring to the Figures, the sensor 24 extends at least partially through the sensor opening 50 along the second axis 52. The sensor 24 extends partially through the valve housing 20 and may towards the first window 72, the first monitoring surface 84, the second monitoring surface 96, and/or the third monitoring surface 106.

The sensor 24 may be at least one of a proximity probe and a magnetic coil, that is arranged to provide a signal indicative of a position of at least one of the first window 72, the first monitoring surface 84, the second monitoring surface 96, and the third monitoring surface 106 relative to the sensor 24 to the controller 26. The sensor 24 may also be arranged to provide a signal indicative of the depth of the first recessed region 70, the second recessed region 90, and the third recessed region 100 to the controller 26. The position of at least one of the first monitoring surface 84, the second monitoring surface 96, and the third monitoring surface 106 relative to the sensor 24 or the depth of the first recessed region 70, the second recessed region 90, and the third recessed region 100 enables the sensor 24 to detect a position of the valve body 22 and therefore quantify the amount of bypass flow through the bypass port 54 based on the amount of the exposed monitoring surface within the sensor's field of view or the proximity of the monitoring surface 84, 96, 106 to the sensor 24.

The controller 26 is arranged to receive the signal from the sensor 24. The controller 26 is programmed to output for display a state of the metering valve 10 (e.g. the amount bypass flow through the bypass port 54) based on the signal.

The sensor 24 in combination with the monitoring surfaces of the recessed regions 70, 90, 100 enables the fuel control system to quantify fuel pump performance or pump issues prior to failure by monitoring the amount of bypass flow through the valve body 22 through the bypass port 54. The sensor 24 is a non-contacting sensor and can be tuned individual applications and sizing without employing a flowmeter within the bypass port 54. The amount of bypass flow through the bypass port 54 corresponds to an amount of fuel present within the fuel control system or the performance of the fuel pump of the fuel control system therefore the present disclosure enables the performance of the fuel pump to be more readily assessed based on the position of the valve body 22.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel metering unit, comprising:
   a metering valve, comprising:
      a valve housing that defines a housing bore that extends from a first valve housing end towards a second valve housing end along a first axis, the valve housing also defining a bypass port;
      a valve body movably disposed within the valve housing, the valve body defining a first bore that extends from a first valve body end towards a second valve body end along the first axis, the valve body also defining a first window fluidly connected to the first bore and that extends through the valve body along a second axis,
   wherein when the valve body is in a position where the first window is in fluid communication with the bypass port fuel enters the first bore and flows through the first window and out through the bypass port; and
   a sensor extending at least partially through the valve housing and facing towards the first window, the sensor being arranged to provide a signal indicative of a position of the first window relative to the sensor;
   wherein the valve body defines a first recessed region that extends from an outer surface of the valve body towards the first bore;
   wherein the first recessed region includes a first face, a second face, and a monitoring surface that extends between the first face and the second face; and
   wherein the first window extends through the monitoring surface.

2. The fuel metering unit of claim 1, wherein the bypass port that is spaced apart from the sensor.

3. The fuel metering unit of claim 2, wherein the first window is selectively fluidly connected to the bypass port.

4. The fuel metering unit of claim 1, wherein the sensor is a proximity probe.

5. The fuel metering unit of claim 1, wherein the monitoring surface is disposed parallel to the first axis.

6. The fuel metering unit of claim 1, further comprising:
   a controller arranged to receive the signal, the controller programmed to output for display a state of the metering valve based on the signal.

7. A metering valve for a fuel metering unit, comprising:
   a valve housing that defines a housing bore that extends from a first valve housing end towards a second valve housing end along a first axis and a bypass port; and
   a valve body movably disposed within the housing bore, the valve body including:
      an outer surface that extends between a first valve body end and a second valve body end along the first axis;
      a first bore that extends from the first valve body end towards the second valve body end along the first axis;
      a first window fluidly connected to the first bore and that extends through the valve body along a second axis; and
   wherein the valve body defines a first recessed region that extends from an outer surface of the valve body towards the first bore;
   wherein the first recessed region includes a first face, a second face, and a monitoring surface that extends between the first face and the second face; and
   wherein the first window extends through the monitoring surface;
   wherein when the valve body is in a position where the first window is in fluid communication with the bypass port fuel enters the first bore and flows through the first window and out through the bypass port.

8. The metering valve of claim 7, wherein the valve body defines a second recessed region that is axially spaced apart from the first recessed region relative to the first axis and radially extends from the outer surface towards the first axis.

9. The metering valve of claim 8, wherein the second recessed region includes a third face, a fourth face, and a second monitoring surface that extends between the third face and the fourth face.

10. The metering valve of claim 9, wherein a first radial distance is defined between the first monitoring surface and the outer surface.

11. The metering valve of claim 10, wherein a second radial distance is defined between the second monitoring surface and the outer surface.

12. The metering valve of claim 11, wherein the first radial distance is greater than the second radial distance.

13. The metering valve of claim 9, further comprising:
a sensor that extends at least partially through the valve housing along the second axis.

14. The metering valve of claim 13, wherein the sensor is arranged to provide a signal indicative of a position of at least one of the first monitoring surface, the second monitoring surface, and the outer surface relative to the sensor.

* * * * *